US012680916B2

(12) United States Patent
Sabato et al.

(10) Patent No.: US 12,680,916 B2
(45) Date of Patent: Jul. 14, 2026

(54) METHOD AND SYSTEM FOR MONITORING A STATUS OF A TYRE

(71) Applicant: Pirelli Tyre S.p.A., Milan (IT)

(72) Inventors: Diego Sabato, Milan (IT); Renan Rodrigues de Mello Ozelo, Milan (IT); Andrea Natta, Milan (IT); Massimiliano Sallusti, Milan (IT); Dario Scaltritti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 206 days.

(21) Appl. No.: 18/257,964

(22) PCT Filed: Dec. 22, 2021

(86) PCT No.: PCT/IB2021/062184
§ 371 (c)(1),
(2) Date: Jun. 16, 2023

(87) PCT Pub. No.: WO2022/144703
PCT Pub. Date: Jul. 7, 2022

(65) Prior Publication Data
US 2024/0003780 A1 Jan. 4, 2024

(30) Foreign Application Priority Data

Dec. 30, 2020 (IT) ........................ 102020000032801
May 24, 2021 (EP) .................................... 21175503

(51) Int. Cl.
*G01M 17/02* (2006.01)
*B60C 11/24* (2006.01)
(52) U.S. Cl.
CPC ......... *G01M 17/025* (2013.01); *B60C 11/243* (2013.01); *B60C 11/246* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 6,278,361 B1 * 8/2001 Magiawala ......... B60C 23/0494
73/11.04
9,259,976 B2 * 2/2016 Singh .................... B60C 11/246
(Continued)

FOREIGN PATENT DOCUMENTS

EP 1 106 397 A2 6/2001
EP 1878596 A2 1/2008
(Continued)

OTHER PUBLICATIONS

International Search Report form the European Patent Office in corresponding International Application No. PCT/IB2021/062184 mailed Apr. 5, 2022.
(Continued)

*Primary Examiner* — Andre J Allen
(74) *Attorney, Agent, or Firm* — Finnegan, Henderson, Farabow, Garrett & Dunner, L.L.P.

(57) ABSTRACT

Method (200), and related system (100), for monitoring a status of a tyre (99) fitted on a vehicle, the method (200) comprising: —with said vehicle in motion and said tyre in rotation, acquiring (3) a motion signal representative of a motion of a crown portion (31) of the tyre (99), the motion signal temporally corresponding to a plurality of turns of the tyre (99); —obtaining (4) a frequency spectrum of the motion signal; —determining (11) the status of the tyre (99) based the frequency spectrum, wherein the motion signal is representative of an axial component of the motion of the crown portion (31).

14 Claims, 3 Drawing Sheets

(58) Field of Classification Search

CPC . B60C 23/0433; B60C 23/0493; B60C 19/00; B60C 23/04; B60C 23/0462; B60C 23/041; B60C 23/20; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/02; B60C 23/0452; B60C 23/0498; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/00318; B60C 23/00; B60C 23/003; B60C 23/00372; B60C 23/0403; B60C 23/0406; B60C 23/0472; B60C 23/066; B60C 29/02; B60C 23/006; B60C 11/00; B60C 23/0454; B60C 23/044; B60C 23/0455; B60C 25/002; B60C 23/008; B60C 23/0483; B60C 23/0461; B60C 23/0474; B60C 23/0489; B60C 23/0491; B60C 29/064; B60C 23/0415; B60C 23/00363; B60C 23/0471; B60C 23/0459; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 25/132; B60C 23/0427; B60C 23/0447; B60C 23/0449; B60C 9/18; B60C 25/00; B60C 23/065; B60C 23/0484; B60C 23/0486; B60C 19/003; B60C 23/00336; B60C 13/00; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 2200/04; B60C 2200/06; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22

USPC ................................................. 73/146–146.8

See application file for complete search history.

(56) References Cited

U.S. PATENT DOCUMENTS

| 11,506,682 B2 | 11/2022 | Honda |
| 2007/0174002 A1 | 7/2007 | Kitazaki et al. |
| 2007/0213953 A1 | 9/2007 | Kitazaki et al. |
| 2008/0015763 A1 | 1/2008 | Kitazaki et al. |
| 2010/0199756 A1 | 8/2010 | Hanatsuka |
| 2014/0366618 A1 | 12/2014 | Singh et al. |
| 2015/0040656 A1 | 2/2015 | Singh et al. |
| 2015/0090023 A1 | 4/2015 | Masago |
| 2018/0154707 A1 | 6/2018 | Singh et al. |
| 2024/0017573 A1* | 1/2024 | Ozelo Rodrigues De Mello ........ B60C 23/064 |
| 2024/0053228 A1* | 2/2024 | Sabato ................... G01M 17/02 |

FOREIGN PATENT DOCUMENTS

| EP | 2172760 A1 | 4/2010 | |
| EP | 2813378 A1 | 12/2014 | |
| EP | 2 837 510 A1 | 2/2015 | |
| EP | 3 210 799 A1 | 8/2017 | |
| EP | 3 330 106 A1 | 6/2018 | |
| JP | 2014102554 A | 6/2014 | |
| WO | WO-2022144703 A1 * | 7/2022 | ........... B60C 11/243 |
| WO | WO-2022144939 A1 * | 7/2022 | ........... B60C 11/246 |
| WO | WO-2022144940 A1 * | 7/2022 | ........... B60C 11/246 |

OTHER PUBLICATIONS

Written Opinion of the International Searching Authority from the European Patent Office in corresponding International Application No. PCT/IB2021/062184 mailed Apr. 5, 2022.
International Search Report form the European Patent Office in corresponding International Application No. PCT/ IT2021/050421 mailed May 2, 2022.
Written Opinion of the International Searching Authority from the European Patent Office in corresponding International Application No. PCT/IT2021/050421 mailed May 2, 2022.

(56) References Cited

OTHER PUBLICATIONS

Office Action issued by the European Patent Office on Aug. 19, 2024, in corresponding European Application No. 21 851 861.1, 4 pages.

International Search Report from the European Patent Office in corresponding International Application No. PCT/ IB2021/050422 mailed Apr. 4, 2022.

Written Opinion of the International Searching Authority from the European Patent Office in corresponding International Application No. PCT/IB2021/050422 mailed Apr. 4, 2022.

\* cited by examiner

METHOD AND SYSTEM FOR MONITORING A STATUS OF A TYRE

This application is a national stage entry application under 35 U.S.C. § 371 of International Application No. PCT/IB2021/062184, filed on Dec. 22, 2021, and claims priority to Italian Application No. 102020000032801, filed Dec. 30, 2020 and European Application No 21175503.8, filed May 24, 2021; the contents of each application is incorporated herein by reference in its entirety.

TECHNICAL FIELD OF THE INVENTION

The present invention relates to a method for monitoring a status of a tyre, for example a status of structural integrity or a status of tread wear, and a related system for monitoring a status of a tyre.

STATE OF THE ART

Typically, a tyre for vehicle has a substantially toroidal structure around a rotation axis thereof during operation, and it has an equatorial plane perpendicular to the rotation axis, said equatorial plane being typically a plane of (substantial) geometric symmetry (e.g., ignoring any minor asymmetries, such as the tread design and/or the writing on the sides and/or structure asymmetries or profile asymmetries).

With "inner cavity" it is meant the space delimited by the inner surface of the tyre and by the surface of the rim which faces towards the inner surface of the tyre, when fitted.

With "crown portion" it is meant the portion of tyre placed at the tread band.

The terms "radial" and "axial" are used with reference respectively to a direction substantially perpendicular to and to a direction substantially parallel to the rotation axis of the tyre.

The term "tangential" is used with reference to a direction substantially perpendicular to both the radial direction and the axial direction (e.g., generally oriented according to the rolling direction of the tyre).

The terms "lateral", "vertical" and "longitudinal" refer respectively to the axial direction, the vertical direction and the horizontal direction.

With "footprint" it is meant the portion of outer surface of the tread band which, during the rolling of the tyre fitted and subjected to a load (for example due to the fitting on a vehicle), is in contact at every moment with the rolling surface. The footprint typically has a substantially null curvature (or substantially infinite curvature radius), or in any case it substantially assumes the conformation of the rolling surface.

With "footprint area" it is meant the part of the crown portion that is at the footprint at each moment.

Each of EP2813378, EP3330106, EP3210799 and EP2837510 discloses a system for estimating the status of wear of a tyre.

SUMMARY OF THE INVENTION

The Applicant has observed that the methods for estimating the wear of a tyre disclosed in EP2813378, EP2837510, EP3330106 and EP3210799 use a correlation model obtained through experimental measurements carried out prior to fitting the tyre on the vehicle and which allow, through identification of the correlation coefficients of the model, to mathematically correlate the inflation pressure of the tyre, the frequency of the vibration mode of the tyre and the thickness of the tread band, the latter quantity being representative of the status of wear of the tyre. To identify these coefficients, cycles of tests are carried out on the tyre, which involve applying a plurality of different values of inflation pressure of the tyre for different predetermined thickness values of the tread band and identifying for each pair of values of pressure and of thickness of the tread band, the frequency of the vibration mode of the tyre from the frequency spectrum of a (accelerometric or speed) signal acquired under such controlled conditions of pressure and thickness of the tread band. During the use of the tyre, the coefficients thus determined are used to calculate the wear as a function of the measured pressure and of the measured frequency.

The Applicant has observed that the methods for estimating the wear of a tyre described in EP2813378, EP2837510, EP3330106 and EP3210799 use an accelerometric (or speed) sensor preferably mounted at the hub of the wheel on which the tyre is fitted, and suitable to detect the vertical and/or longitudinal components of the acceleration (or speed) of the tyre. By the acquisition of these physical quantities, it is possible to obtain the frequency of the desired vibration mode used to implement the aforesaid method for estimating the wear of the tyre. In particular, from the acquisition of the vertical component of the acceleration the frequency of the vertical vibration mode is obtained, while from the acquisition of the longitudinal component of the acceleration (or alternatively from the acquisition of the speed) the frequency of the torsional vibration mode is obtained.

The Applicant has however noted that the frequency spectrum obtained from the aforesaid accelerometric or speed signals (i.e., along the vertical and longitudinal components) contains not negligible contributions from a relatively large number of vibration modes of the tyre. This makes unclear the obtained frequency spectrum and makes it difficult to identify the frequency of a generic single vibration mode, both in terms of identification of the correct frequency of the selected vibration mode, and in terms of risk of an overlapping of the vibrational effects visible on a single frequency of the spectrum. For example, the Applicant has observed that the frequency spectrum obtained by acquiring the vertical component or the longitudinal component of the acceleration contains a substantial contribution deriving from at least four of the first six vibration modes of the tyre (for example the two rotational modes around the two axes perpendicular to the rotation axis of the tyre and the two translational modes along said two axes).

With "first vibration modes" it is meant the six vibration modes of the tyre in which the belt layers are substantially not subjected to deformation, i.e., the lateral translational, vertical translational, horizontal translational, torsional around the rotation axis of the tyre (Y), torsional around the vertical axis (Z) and torsional around the horizontal axis (X).

The Applicant has therefore faced the problem of obtaining a reliable and accurate method and system for monitoring the status of a tyre, e.g., the status of wear and/or of integrity.

According to the Applicant, this problem is solved by a method and a system for monitoring the status of a tyre which is based on the frequency processing of a motion signal representative of the axial (i.e., lateral) component of the motion of a crown portion of the tyre.

According to an aspect the invention relates to a method for monitoring a status of a tyre fitted on a vehicle, the method comprising:

with said vehicle in motion and said tyre in rotation,
acquiring a motion signal representative of a motion of
a crown portion of said tyre, said motion signal tem-
porally corresponding to a plurality of turns of said
tyre;

obtaining a frequency spectrum of said motion signal;

determining said status of the tyre based said frequency
spectrum.

Advantageously said motion signal is representative of an
axial component of said motion of the crown portion.

According to another aspect the invention relates to a
system for monitoring a status of a tyre fitted on a vehicle,
the system comprising:

a motion sensor fixed at a crown portion of said tyre and
configured for detecting a motion of said crown portion
of the tyre and generating a motion signal representa-
tive of said motion;

at least one processing unit in communication with said
motion sensor and programmed and configured for:

acquiring said motion signal, wherein said motion
signal temporally corresponds to a plurality of turns
of said tyre;

obtaining a frequency spectrum of said motion signal;

determining said status of the tyre based on said
frequency spectrum.

Advantageously said motion sensor is configured for
detecting an axial component of said motion of the crown
portion and said motion signal is representative of said axial
component of said motion.

The Applicant has verified that the frequency spectrum of
a motion signal representative of an axial (i.e., lateral)
component of the motion of the crown portion of the tyre is
clearer and more reliable than, for example, the frequency
spectra of the radial component or tangential component of
the motion. Without limiting to any interpretative theory, the
Applicant believes that the frequency spectrum of the axial
component contains a substantial contribution of relatively
few vibration modes of the tyre. This could be due, for
example, to the intrinsic nature of the rolling phenomenon
that occurs in the plane perpendicular to the rotation axis,
i.e., defined by the vertical and horizontal directions. For
example, with regard to the first six vibration modes (which
the Applicant considers to be particularly reliable for the
determination of the status of the tyre), the Applicant
believes that the frequency spectrum according to the pres-
ent invention contains the substantial contribution of only
the lateral translational vibration mode, the rotational vibra-
tion mode around the vertical axis (Z) and the rotational
vibration mode around the horizontal axis (X), while the
contribution of the three remaining first vibration modes,
i.e., the rotational mode around the axis (Y) perpendicular to
the two vertical (Z) and horizontal (X) axes and the two
translational modes along said two axes, is substantially
negligible.

In this way, the method for monitoring the status of a tyre
according to the present invention allows obtaining an
accurate and reliable determination of the status in which the
tyre is.

The Applicant also observes that in the technical field of
the determination of the status of a tyre by the processing of
the motion signals, the axial component of the motion is
usually not considered, since it is believed that during
normal use of the tyre this component is not very excited and
therefore contains a low information content.

The present invention in one or more of the aforesaid
aspects can have one or more of the following preferred
features.

Preferably said at least one processing unit is programmed
and configured for carrying out any one of the embodiments
of the method of the present invention.

Preferably said motion signal is an accelerometric signal
representative of an axial (i.e., lateral) component of a, more
preferably linear, acceleration undergone by said crown
portion of said tyre, more preferably by a portion of an inner
surface of the tyre belonging to said crown portion of said
tyre.

In one embodiment said first signal is a speed (or dis-
placement/deformation) signal representative of an axial
component of a linear speed (or of a displacement/deforma-
tion) of said crown portion of said tyre, more preferably of
said portion of inner surface of the tyre belonging to said
crown portion of said tyre. In this way it is acquired a signal
easily to be frequency processed and easily detectable with
a suitable sensor.

Preferably said motion sensor is an accelerometric sensor
(alternatively it is a speed or a displacement/deformation
sensor) configured for detecting an axial (i.e., lateral) com-
ponent of a, more preferably linear, acceleration (or of a
speed or of a displacement/deformation) undergone by said
crown portion of said tyre, more preferably by a portion of
inner surface of the tyre belonging to said crown portion of
said tyre. Preferably said motion sensor is fixed at said
portion of inner surface.

The Applicant believes that the accelerometric signal
and/or the speed (or displacement/deformation) signal are
easily acquirable (e.g., by suitable sensors applied to the
inner surface of the tyre) and/or suitable to be frequency
processed.

Preferably said determining said status of the tyre is
carried out based on a (preferably continuous) portion of
said frequency spectrum in a frequency range from 20 Hz up
to 200 Hz, more preferably up to 120 Hz. In fact, the
Applicant believes that at least some of the first vibration
modes of the tyre are in this frequency range, which there-
fore has high information content for the purposes of moni-
toring the status of the tyre.

Preferably said determining said status of the tyre is
carried out based on a time trend of said frequency spectrum,
more preferably of said portion of the frequency spectrum.
In this way it is possible to monitor a possible change over
time of the frequency spectrum (and in particular of the
portion of the frequency spectrum between 20-200 Hz),
change that the Applicant believes to be directly correlated
to a change in the status of the tyre.

Preferably said frequency spectrum comprises a plurality
of peaks. The Applicant has realized that the peaks of the
frequency spectrum are representative of respective vibra-
tion modes of the tyre or combinations of vibration modes
of the tyre.

Preferably it is provided identifying a determined peak in
said plurality of peaks and determining a frequency of the
determined peak. Preferably said determining said status of
the tyre is carried out based on a temporal trend of said
frequency of the determined peak. The Applicant has in fact
realized that the determined peak is representative of a
selected vibration mode of the tyre which advantageously
can be easily identified within the frequency spectrum. By
monitoring the frequency of the determined peak over time,
it is therefore possible to obtain a simple, reliable and
accurate determination of the status of the tyre.

Preferably said frequency of the determined peak is a
modal frequency of a lateral translational vibration mode of
the tyre.

Preferably said identifying said determined peak comprises:

in said frequency spectrum, ordering the peaks of said plurality of peaks, assigning a sequential (increasing) order n to an increasing value of the frequency of each peak in the frequency spectrum;

in said frequency spectrum, identifying a peak of order n equal to one, said peak of order n equal to one being said determined peak.

Preferably said identifying said determined peak comprises identifying in said frequency spectrum a peak in a predetermined frequency range, more preferably said predetermined frequency range goes from 20 Hz (more preferably from 25 Hz, even more preferably from 30 Hz) up to 100 Hz (more preferably up to 80 Hz, even more preferably up to 75 Hz, even more preferably up to 70 Hz, even more preferably up to 60 Hz).

The Applicant has realized that when a motion signal, e.g., an accelerometric signal, representative of the axial component of the motion (e.g., of the acceleration) is acquired and the frequency spectrum of the motion signal is obtained, the peak of order one in the frequency spectrum, which usually is located in the aforesaid frequency range (and therefore can be identified according to the order and/or according to the frequency position), represents the first lateral translational vibration mode of the tyre. The Applicant believes that this mode is particularly advantageous to be used for the determination of the status of the tyre since it is easily identifiable in the frequency spectrum since it is located in a portion of the frequency spectrum wherein the contribution of the other vibration modes of the tyre is substantially absent and therefore it is the only evident peak in this portion of the frequency spectrum. The Applicant has in fact discovered that the lateral translational vibration mode is substantially free of interference from the other vibration modes of the tyre and/or it is not substantially influenced by factors extrinsic to the vibration phenomenon, but it is (substantially) only influenced by the status in which the tyre is when the motion signal is acquired. Consequently, a change in the frequency of the lateral translational vibration mode allows obtaining a direct and unambiguous indication of a corresponding change of the status in which the tyre is, thus making accurate and reliable the determination of the status of the tyre.

Preferably said plurality of turns of the tyre contains a total number of said turns greater than or equal to 300, more preferably greater than or equal to 500, and preferably less than or equal to 2000. The Applicant has experimentally verified that this range of values is a good compromise between high reliability and precision of the spectral analysis (dependent on the temporal length of the acquired signal) and the related request of memory capacity, processing capacity, acquisition time and/or energy consumption.

In one embodiment said motion signal comprises a plurality of motion signal portions temporally corresponding to a plurality of continuous time intervals.

Preferably each continuous time interval is temporally separated from the (temporally) subsequent continuous time interval. In other words, said motion signal is obtained by acquiring signal portions at time intervals spaced apart with respect to each other.

The Applicant has verified that in this way it is possible to obtain an improvement in the reliability and/or in the accuracy of the spectral analysis, and moreover it is possible making the method compatible with a normal use of a vehicle. The Applicant has in fact realized that the acquisition conditions of the motion signal during the use of the tyre significantly affect the quality (in terms of information content) of the obtained frequency spectrum and consequently also the subsequent estimate of the status of the tyre. In particular, the Applicant has realized that for improving the quality, the reliability and the precision of the method and for accurately identifying different status of the tyre (for example different levels of wear of the tyre) it is advantageous acquiring the signal varying the excitation conditions of the tyre, to completely excite it. The acquisition of a motion signal composed of different portions not temporally consecutive and therefore representative of temporally and spatially spaced apart conditions of the advancement of the vehicle makes reasonably possible the acquisition of signal portions representative of different excitation conditions of the tyre and its vibration modes, thus making the information content of the resulting frequency spectrum richer and more complete. Furthermore, this technique allows to obtain the signal, albeit in different acquisitions, on a (typically predetermined) sufficient total number of turns, respecting the acquisition conditions of the method, compatibly with a normal use of the vehicle (during which the conditions vary in an unpredictable way and regardless of the requirements of the present method).

Typically, each signal portion temporally corresponds to at least one turn of said tyre, more preferably to a respective plurality of turns of the tyre.

Preferably the acquisition of said motion signal is carried out provided that a lateral acceleration of the vehicle is less than or equal to 2 m/s$^2$, more preferably less than or equal to 1 m/s$^2$, even more preferably less than or equal to 0.5 m/s$^2$, (in absolute value). In other words, the motion signal is typically acquired during a (substantially) straight forwarding of the vehicle, for example the acquisition of the motion signal does not take place during turns.

Preferably the acquisition of said motion signal is carried out provided that a longitudinal acceleration of the vehicle is less than or equal to 2 m/s$^2$, more preferably less than or equal to 1 m/s$^2$, even more preferably less than or equal to 0.5 m/s$^2$, (in absolute value). In other words, the motion signal is acquired in conditions of (substantially) constant forward speed of the vehicle, for example the acquisition of the motion signal does not occur during the acceleration or braking phases of the vehicle.

The Applicant has experimentally verified that in one or both these conditions the reliability, the accuracy and/or the precision of the frequency analysis improves. This could be due to the fact that in one or both these conditions it is possible to limit possible disturbances on the motion signal linked to phenomena extrinsic to the vibration modes of the tyre, which introduce information contributions in the frequency spectrum not related to the vibration modes of the tyre.

Preferably the system comprises an acceleration sensor, more preferably mounted onto said vehicle, for detecting a longitudinal and/or lateral acceleration of the vehicle, the acceleration sensor being connected to said at least one processing unit. In this way it is possible to detect the longitudinal and/or lateral acceleration of the vehicle to drive the acquisition of the motion signal when the longitudinal acceleration and/or lateral acceleration are within the aforesaid value ranges.

Preferably the acquisition of said motion signal is carried out provided that a forward speed of the vehicle is greater than or equal to 20 km/h, more preferably greater than or equal to 30 km/h, and/or less than or equal to 80 km/h, more preferably less than or equal to 70 km/h. The Applicant has verified that in this range of forward speed of the vehicle it is possible obtaining a good quality of the motion signal for the frequency processing.

Preferably the system comprises a speed sensor, more preferably mounted onto said vehicle, for detecting a forward speed of the vehicle, the speed sensor being connected to said at least one processing unit. In this way it is possible to detect the forward speed of the vehicle to drive the acquisition of the motion signal when the forward speed is within the aforesaid value range.

Preferably said acquiring said motion signal comprises acquiring a raw signal representative of said axial component of the motion of the crown portion and filtering from the raw signal, more preferably eliminating from the raw signal or reducing a value of, a part of the raw signal temporally corresponding (at least) to each passage of said crown portion (and/or of said motion sensor) in a footprint area of the tyre. In this way it is filtered the part of the motion signal in which the crown portion is substantially constrained to the rolling surface, and therefore poorly or not at all correlated to the selected vibration mode, allowing to improve the quality of the signal.

Preferably said determining said status of the tyre comprises determining a status of loss of structural integrity of said tyre provided that said frequency of the determined peak temporally decreases.

Preferably said determining said status of the tyre comprises determining a status of wear of (a tread band of) said tyre provided that said frequency of the determined peak temporally increases.

The Applicant has in fact realized that, at least for the first six vibration modes of the tyre (among which there is the lateral translational vibration mode) in which the belt layers are not subjected to deformation, the square of the modal frequency (f) is directly proportional to the modal stiffness (k) and inversely proportional to the modal mass, or moment of inertia, (m), with the three quantities that are linked by the mathematical formula $$f = \frac{1}{2}\sqrt{\frac{k}{m}}.$$

The Applicant has observed that for a tyre the modal stiffness and the modal mass can be considered mutually independent quantities, in particular since the modal stiffness is substantially determined by the stiffness of the carcass while the modal mass is substantially determined by the mass of the elastomeric compounds (and in particular mainly by the mass of the tread band and in part of the sidewall), and that these quantities remain substantially constant or at most decrease during the operative life of the tyre (provided that the operating parameters of the tyre remain constant): for example a significant increase in the stiffness of the carcass or an increase in the mass of the elastomeric compounds is typically not possible during use of the tyre. Therefore, in the event of wear of the tyre in which, for example, a reduction in the tread mass occurs, there will be a decrease in the modal mass of the tyre with respect to the modal mass of a not worn (e.g., new) tyre, with a consequent increase in the modal frequency. Conversely, in the event of a loss of structural integrity in which the stiffness of the carcass decreases, a reduction in the modal stiffness of the tyre will occur with respect to the modal stiffness with the tyre in a reference status (see below), with a consequent decrease in the modal frequency.

In one embodiment, said motion signal is representative only of said axial component of said motion of the crown portion, and it is provided determining said status of wear based only on said frequency spectrum. In other words, the wear is determined only by considering the lateral component of the motion of the crown portion, without considering the axial or tangential components. The Applicant has in fact verified that in this way the results are sufficiently reliable, in face of the simplicity of the method.

In one embodiment (alternative to the preceding one), it is provided:

acquiring a further motion signal representative of a radial and/or tangential component of said motion of the crown portion, obtaining a further frequency spectrum of said further motion signal;

based on said further frequency spectrum, verifying said status of wear determined based on said frequency spectrum.

Preferably it is provided carrying out on said further motion signal one or more of the above operations carried out on said motion signal.

In other words, the radial and/or tangential components are used as control variable of the status of wear determined based only on the lateral component.

Preferably determining the status of wear of said tyre is carried out by:

determining a reference modal mass of the tyre in a reference status;

determining a reference modal stiffness of the tyre in said reference status;

determining a thickness of a tread of said tyre as a function of said reference modal mass, said reference modal stiffness, said frequency of the determined peak and as a function of geometric or physical parameters of said tyre (e.g., geometric radius of the components of the tyre, tread width, etc).

Preferably said reference modal mass is greater than or equal to 60%, more preferably greater than or equal to 65%, and/or less than or equal to 85%, more preferably less than or equal to 82%, of a total mass of said tyre.

Preferably said reference status is a status of undamaged and not worn tyre (i.e., the tyre is substantially new, except for a minimum mileage as explained below). In this way the reference status represents an acceptable status of the tyre.

Preferably it is provided determining said reference status provided that said vehicle has travelled a predetermined distance since when the tyre in a new status is fitted. For example, said distance is greater than or equal to 300 km, more preferably greater than or equal to 500 km, and more preferably less than or equal to 1000 km. In this way it is possible allowing the relaxation of the tyre, which releases the tensions accumulated during the production process (in particular during the vulcanization step), without however the tyre being significantly worn. Thus making, the initial transitory phase of the operative life of the tyre (e.g., within the firsts hundreds of kilometres) is eliminated, in which the tyre still has a configuration that does not reflect the one it will then assume for the remaining part of its operative life (unless of structural failure).

Preferably said determining said reference modal stiffness of the tyre is carried out as a function of said reference modal mass of the tyre and of said frequency of the determined peak determined with said tyre in the reference status. In this way it is possible to obtain the value of the reference modal stiffness which, according to the Applicant, is a value which, under the same operating conditions of the tyre, typically remains substantially constant during the whole operative life of the tyre (for the same operating conditions of the tyre and the same integrity of the tyre), from when the tyre has assumed the reference status onwards.

Preferably said acquiring said motion signal is carried out at a respective current value of one or more operating parameters of said tyre and said method comprises detecting said respective current value of said one or more operating parameters.

Preferably said one or more operating parameters of said tyre are selected in the group: pressure, forward speed, temperature and vertical load.

In this way the operating parameters that could affect the stiffness of the carcass of the tyre, and thus the modal frequencies, are controlled.

Preferably said acquiring said motion signal is carried out at a current value of a pressure of said tyre and said method comprises detecting said current value of pressure. In particular, the Applicant has experimentally verified that the pressure is the parameter which mostly influences the modal frequency of the lateral translational mode of the tyre.

Preferably the system comprises a pressure sensor, more preferably mounted onto said tyre, for detecting a pressure of the tyre, the pressure sensor being connected to said at least one processing unit.

In one embodiment the system comprises a temperature sensor for detecting an inner temperature of the tyre, the temperature sensor being connected to said at least one processing unit.

In this way, it is possible to accurately measure the value of the operating parameters of the tyre and to control a potential change over time in the operating parameters of the tyre, which could limit the reliability of the method.

Preferably said determining said status of the tyre based on said frequency spectrum is carried out as a function of said one or more operating parameters of the tyre, more preferably as a function of at least said pressure.

Preferably said acquiring a motion signal, obtaining said frequency spectrum and determining said status of the tyre based on said frequency spectrum, more preferably based on said frequency of the determined peak, are carried out in a first operative phase with said tyre in said reference status and, typically in an iterative way, in a second operative phase subsequent to said first operative phase. In this way it is possible to evaluate a change in the status of the tyre entirely with the tyre fitted on the vehicle and during normal use of the vehicle by comparing the frequency spectra (preferably the frequency of the determined peak) obtained in the first and second operative phases. The Applicant has in fact observed that the frequency spectrum obtained in the first operative phase is representative of the vibration modes of the tyre with the tyre in the reference status, which advantageously can coincide with the status of substantially new tyre, while the frequency spectrum obtained in the second operative phase is representative of the vibration modes of the tyre with the tyre in a current status potentially different from the reference status. From this observation, the Applicant has realized that it is possible to determine the status of the tyre by comparing the frequency spectra obtained in the first and second operative phase and evaluating any deviation between the two frequency spectra, thus implementing the whole method for monitoring the status of the tyre with the tyre fitted on the vehicle (i.e., without pre-calibration) and limiting the possibility of overestimating or underestimating the status, for example of wear or of structural integrity, in which the tyre is.

Preferably, in said second operative phase, it is provided determining a reference frequency using a predetermined mathematical function between said frequency of the determined peak of said frequency spectrum obtained in said first operative phase and at least one respective value of the pressure of the tyre detected in said first and second operative phase. In this way the method is particularly simple to be implemented and reliable since the determination of the status of the tyre can be carried out taking into account at least the pressure of the tyre. In particular, the Applicant has verified that the trend with which the frequency of the determined peak varies as a function of at least the pressure (optionally also as a function of the others operating parameters) can be determined once and for all through physical/mathematical models (which can be applied to a wide class of tyres). This trend of the change of the frequency of the determined peak varies as a function of at least the pressure can then be used to calculate an expected value that the frequency of the determined peak should assume during the second operative phase, if no changes have occurred in the status of the tyre.

In one embodiment said predetermined mathematical function is expressed by the following formula:

$$f(p) = \sqrt[2]{f_0^2\left(1 + \alpha_p \frac{p - p_0}{p_0}\right)}$$

wherein f(p) is said reference frequency, p is the current value of the pressure detected in the second operative phase; $f_0$ is the frequency of the determined peak of the frequency spectrum obtained in the first operative phase, $p_0$ is the pressure value detected in the first operative phase and $\alpha_p$ is, for example, a mathematical constant. This mathematical function takes into account at least the pressure which is the operating parameter that greatly affect the stiffness and thus the modal frequency.

Preferably determining said status of wear of said tyre comprises calculating a modal mass reduction of the tyre. Preferably said modal mass reduction is calculated by a quadratic ratio between said reference frequency and said frequency of the determined peak of the frequency spectrum obtained in the second operative phase. Alternatively, said modal mass reduction is calculated by the difference between said reference modal mass and a current modal mass of said tyre calculated as a function of said reference modal mass and of said respective frequencies of the determined peak. In this way, a qualitative or quantitative estimate of the wear degree undergone by the tyre is simply obtained.

Preferably said calculating a thickness of the tread is carried out as a function of said current modal mass of the tyre and as a function of geometric or physical parameters of the tyre, for example the density of the compound, the width and the initial thickness of the tread band. In this way, the calculation of the thickness of the tread band is simplified for quantifying the wear degree undergone by the tyre.

DETAILED DESCRIPTION OF SOME EMBODIMENTS OF THE INVENTION

The features and advantages of the present invention will be further clarified by the following detailed description of some embodiments of the present invention, presented by way of non-limiting example, with reference to the attached figures.

Figure 1:
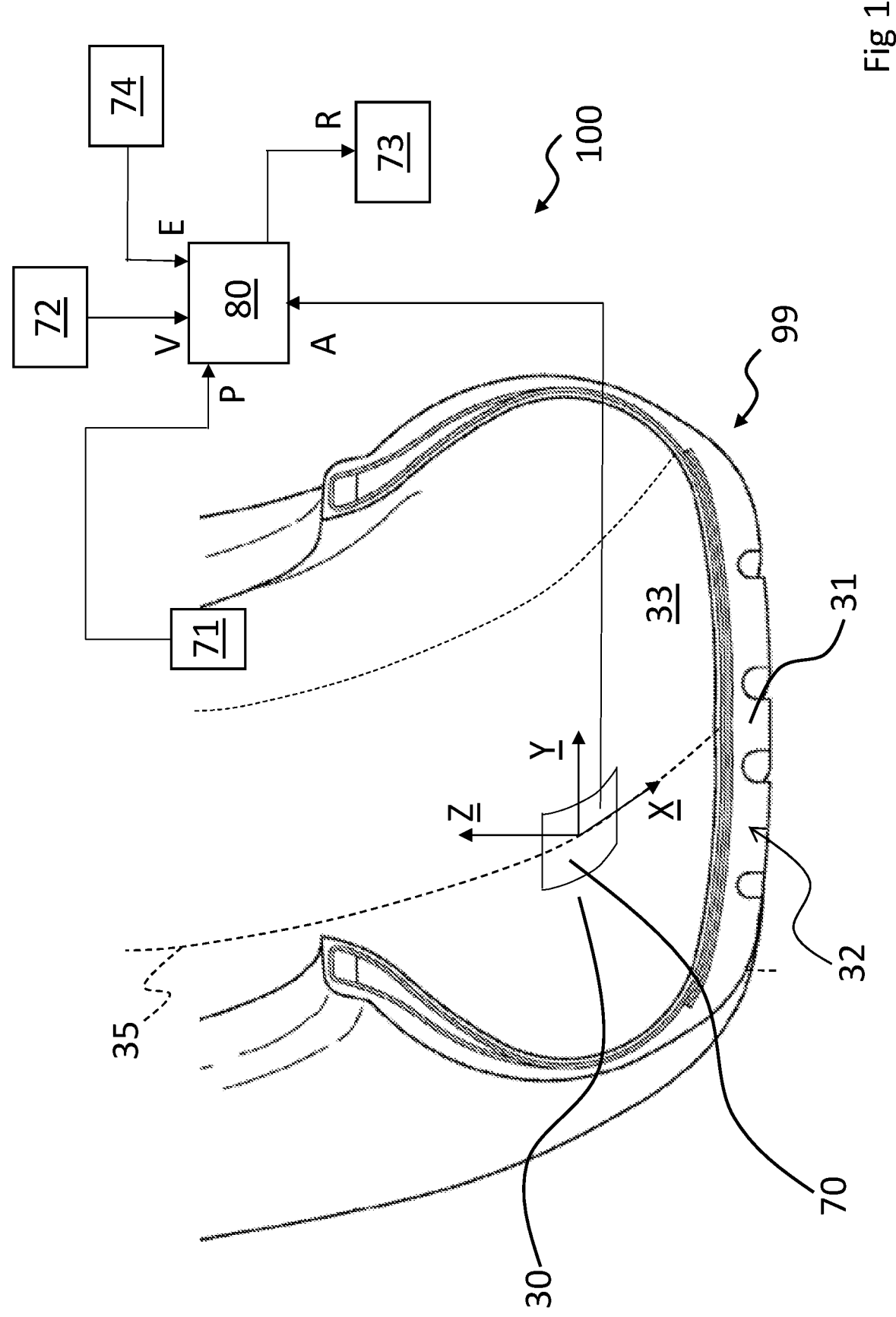
FIG. 1 shows a schematic, perspective and partial view of a section of tyre comprising a motion sensor belonging to the system for monitoring according to the present invention (schematized in the figure)

In FIG. 1 with the reference number 100 a system for monitoring a status of a tyre 99 according to the present invention is schematically shown. The system 100 comprises a motion sensor 70, for example a triaxial accelerometric sensor, fixed to a portion 30 of the inner surface 33 of the tyre 99 belonging to a crown portion 31 of the tyre (i.e., the portion of tyre at the tread band 32). Preferably the accelerometric sensor 70 is mounted at a median plane of the tyre 99 (indicated by the dashed line 35). All figures are shown not to scale, for illustrative purposes only.

The accelerometric sensor 70 is advantageously placed so that its three axes are aligned respectively with the axes X (along the longitudinal direction), Y (along the axial direction) and Z (along the radial direction) and it is configured to separately detect a tangential component (directed along the X axis), an axial component (directed along the Y axis) and a radial component (directed along the Z axis) of the linear acceleration undergone by the portion 30 of inner surface 33 of the tyre. For the purposes of the present invention, it is sufficient that the accelerometric sensor detects the axial component (Y), e.g., a mono-axial sensor.

The system for monitoring 100 comprises a processing unit 80 in communication, for example through the (for example wireless) communication line A, with the accelerometric sensor 70 to receive an accelerometric signal representative of the axial component (Y) of the detected linear acceleration.

The present invention contemplates any arrangement and logical and/or physical partition of the processing unit, which can for example be a single physical and/or logical unit or composed of several distinct and cooperating physical and/or logical units, such units being possibly placed, in whole or in part, in the accelerometric sensor, in the tyre, in the rim, on board the vehicle (not shown) on which the tyre 99 is fitted, and/or in a remote station in connection with the vehicle on which the tyre 99 is fitted.

Exemplarily the processing unit 80 is connected, exemplarily by communication line R (with or without wires), to a display device 73, for example the screen of the on-board computer of the vehicle, for transmitting the result of the monitoring of the status of the tyre.

Exemplarily the system for monitoring 100 also comprises a pressure sensor 71, exemplarily housed in the valve or on the inner surface of the tyre 99 (for example next to the sensor 70), and configured to detect a pressure of the tyre 99 (i.e., the inflation pressure of the tyre into the inner cavity of the tyre). The pressure sensor 71 is in communication, exemplarily through the (for example wireless) communication line P, with the processing unit 80 for transmitting the measured pressure value.

Exemplarily the system for monitoring 100 comprises a speed sensor 72, exemplarily mounted on the vehicle, and configured to detect a forward speed of the vehicle (and consequently of the tyre 99). The speed sensor 72 is in communication, exemplarily through the communication line V (with or without wires), with the processing unit 80 for transmitting the measured forward speed value.

Exemplarily the system for monitoring 100 further comprises an acceleration sensor 74, exemplarily mounted onto the vehicle (e.g., forming part of the inertial platform of the vehicle), and structured to detect a longitudinal and/or lateral acceleration of the vehicle (and consequently of the tyre 99). The acceleration sensor 74 is in communication, exemplarily through the communication line E (with or without wires), with the processing unit 80 for transmitting the measured longitudinal and/or lateral acceleration value.

Exemplarily the processing unit 80 is programmed and configured to carry out the operations described below.

Figure 2:
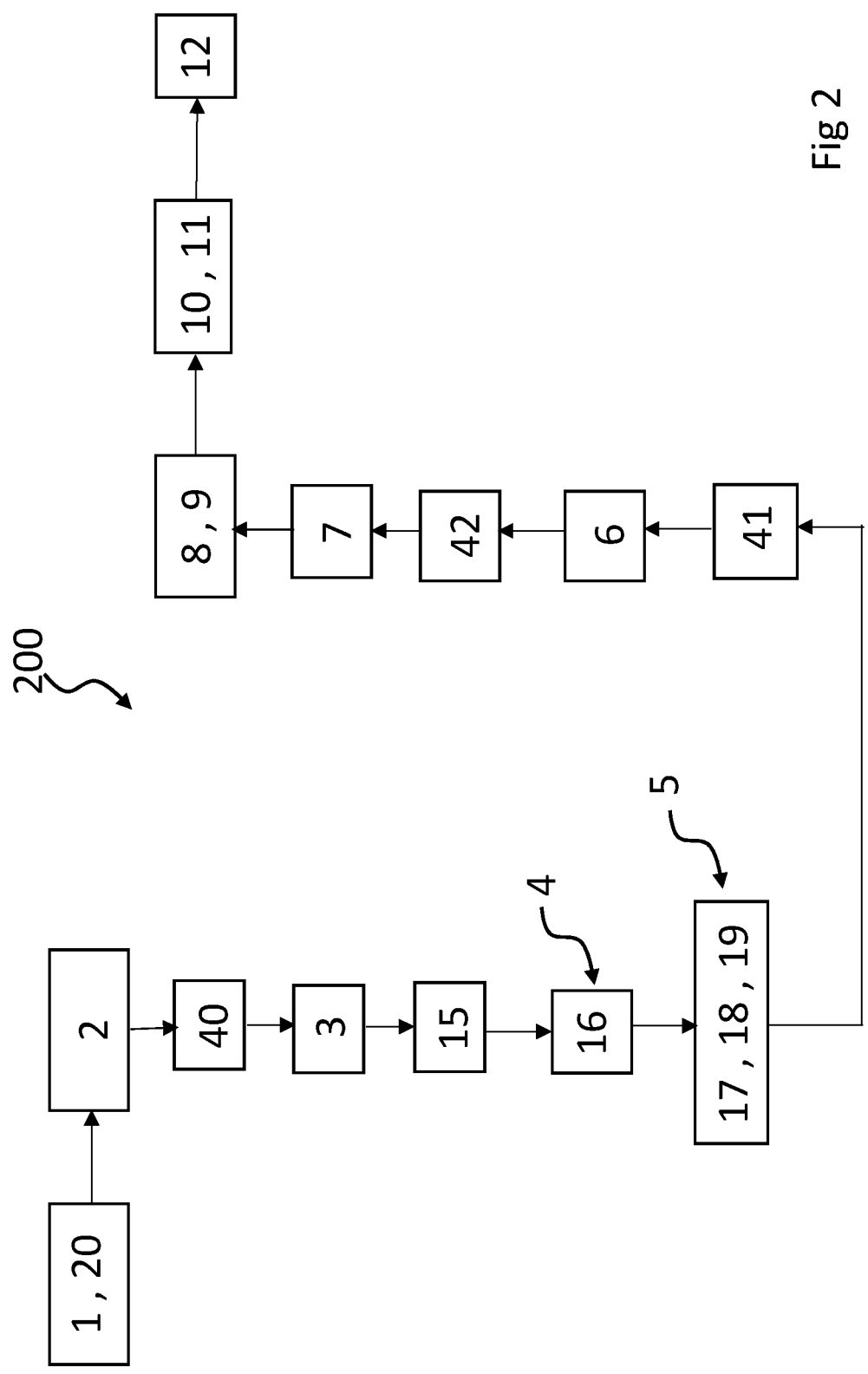
FIG. 2 shows a flow diagram of a method for monitoring the status of a tyre according to one embodiment of the present invention.

FIG. 2 shows a flow diagram of the operations of an example of a method for monitoring 200 a status of a tyre 99 according to the present invention, which can be implemented with the system for monitoring 100 described above.

Preferably the tyre 99 is fitted 1 on the vehicle and is inflated 20 to a desired pressure, exemplarily equal to the operating pressure of the tyre, for example equal to 200 kPa.

Exemplarily the method 200 comprises determining 2 (for example entering in the processing unit at the time of the fitting of the tyre) a reference modal mass of the tyre. In general, the reference modal mass is a parameter that depends on the chosen tyre type, and has a value equal to about 75% of the total mass of the tyre 99 for standard tyres, a value equal to about 70% of the total mass of the tyre for tyres having the bead area thicker than the tread area and a value equal to about 80% of the total mass of the tyre for tyres having the bead area thinner than the tread area. Subsequently, in a first operative phase which for example starts when the vehicle has travelled about 500 km from the condition of new tyre, with the tyre 99 in a reference status (in the example the status of relaxed tyre, i.e., that has released the internal stresses due to the production process, e.g., to the vulcanization, but still in a status of perfect structural integrity and of not worn tread) the method 200 comprises the following operations.

Exemplarily it is provided detecting 40 a value of the pressure of the tyre 99 in the first operative phase, and acquiring 3 an accelerometric signal representative of only the axial component of the linear acceleration undergone by the portion 30 of inner surface 33 at the detected pressure value.

Exemplarily acquiring 3 the accelerometric signal is carried out provided that a longitudinal and/or lateral acceleration of the vehicle is less than or equal to 0.5 m/s$^2$.

Exemplarily acquiring 3 the accelerometric signal is carried out provided that a forward speed of the vehicle is between 20 km/h and 70 km/h (extremes included).

Exemplarily a raw signal is first acquired, for example the continuous signal generated by the sensor (exemplarily comprising a plurality, for example hundreds, of turns of the tyre).

Exemplarily the raw accelerometric signal comprises a plurality of accelerometric signal portions, each signal portion temporally corresponding to a continuous time interval (exemplarily corresponding to at least one complete turn, typically tens of complete turns, of the tyre), wherein each time interval is temporally separated from a subsequent time interval.

Exemplarily it is provided carrying out a series of pre-elaboration and/or filtering operations 15 on the raw accelerometric signal in order to eliminate any disturbances. In particular, it is provided filtering from the raw accelerometric signal, for example reducing in value by a Hanning window, a part of the signal temporally corresponding to each passage of the crown portion 31 in the footprint area of the tyre 99.

The accelerometric signal on which the following operation will be carried out is thus obtained.

Through frequency analysis, a frequency spectrum of the accelerometric signal is obtained 4, the frequency spectrum exemplarily comprising a plurality of peaks. For example, the frequency spectrum is obtained calculating a fast Fourier transform (FFT) 16 or by carrying out a PSD (Power Spectral Density) operation on the acquired accelerometric signal.

It is provided identifying 5 a determined peak of the plurality of peaks and determining a frequency of the determined peak (i.e., the frequency at which the determined peak occurs).

Exemplarily identifying 5 the determined peak in the frequency spectrum comprises:

identifying 17 each peak of the plurality of peaks, for example by identifying the inflection points with a positive second derivative within the frequency spectrum (or by identifying the points having a null first derivative and a positive second derivative within the frequency spectrum);

ordering 18 the peaks by assigning a sequential (for example increasing) order n with an increasing value of the frequency at which each peak occurs;

selecting 19 a peak of order one, which, for example, lies within the frequency range 30-80 Hz.

In one embodiment identifying 5 the determined peak comprises identifying the only peak that substantially entirely falls in the frequency range 30-80 Hz.

Figure 3:
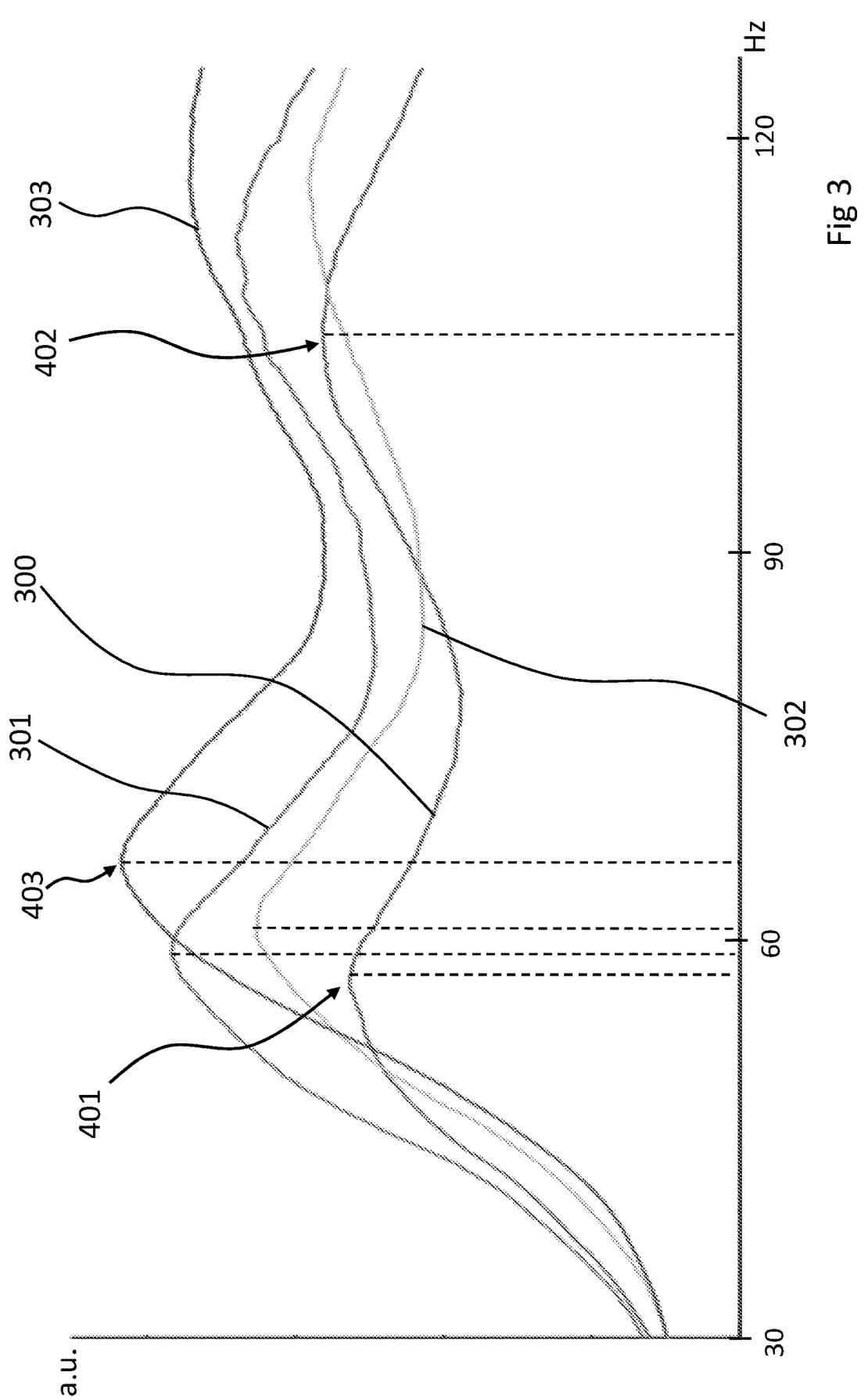
FIG. 3 schematically shows an example of a frequency spectrum obtained respectively for four different wear values of the tread band of a tyre applying the method of the present invention.

For example, in FIG. 3 the curve 300 represents a portion comprised between 30 and 120 Hz (i.e., the portion of spectrum with higher information content) of a frequency spectrum obtained for a not worn tyre and in the reference status, in which the peaks of order one (indicated with the number 401) and of order two (indicated by the number 402), and the respective frequencies, are at least partially visible.

Exemplarily the processing unit 80 is configured for storing the frequency of the determined peak determined in the first operative phase of the vehicle.

Subsequently, exemplarily in a second operative phase which for example begins after travelling 1000 km, the method 200 comprises carrying out the following operations (in iterative way, for example after travelling every 50 km):

i) detecting 41 a current value of the pressure of the tyre 99 in the second operative phase;

ii) acquiring 6 an accelerometric signal representative of the lateral component of the acceleration undergone by the portion 30 of the inner surface 33 at the value of the pressure in the second operative phase. The acquisition of the accelerometric signal in the second operative phase respects the same conditions as the acquisition of the accelerometric signal in the first operative phase, and the accelerometric signal in the second operative phase is built as explained above for the accelerometric signal in the first operative phase;

iii) from the raw accelerometric signal acquired in the second operative phase, filtering 42 the part of signal comprising the footprint area as exemplarily explained above for the accelerometric signal in the first operative phase;

iv) after the filtering 42, obtaining 7 a frequency spectrum of the accelerometric signal, this frequency spectrum exemplarily comprising a respective plurality of peaks. For example, even the frequency spectrum obtained in the second operative phase is obtained by applying a fast Fourier transform (FFT) or a PSD operation on the accelerometric signal;

v) identifying 8 a determined peak in the plurality of peaks of the frequency spectrum obtained in the second operative phase, which corresponds to the determined peak in the plurality of peaks of the frequency spectrum obtained in the first operative phase. In other words, the determined peak identified in the second operative phase is also the peak of order one in the frequency spectrum obtained in the second operative phase, and it is within the frequency range 30-80 Hz;

vi) determining 9 a frequency of the determined peak identified in the frequency spectrum obtained in the second operative phase.

With reference to FIG. 3, curves 301, 302 and 303 represent a portion comprised between 30 and 120 Hz of three different exemplary frequency spectra obtained in the second operative phase for three different wear values of the tyre 99 (respectively 2 mm, 4 mm and 6 mm of wear). For each of these curves, the peaks of order one (within the frequency range 30-80 Hz) and (at least partially) of order two (above 80 Hz), and the respective frequencies, are visible.

Exemplarily it is provided, for example after having detected the current value of the pressure in the second operative phase, determining 10 a reference frequency as a function of the frequency of the determined peak of the frequency spectrum obtained in the first operative phase, and of the values of the pressure detected in the first and the second operative phase, exemplarily by the following mathematical formula:

$$f(p) = \sqrt[2]{f_0^2\left(1 + \alpha_p \frac{p - p_0}{p_0}\right)}$$

wherein $f(p)$ is the reference frequency, $f_0$ is the frequency of the determined peak of the frequency spectrum obtained in the first operative phase, $p$ and $p_0$ are the pressure values respectively detected in the second and the first operative phase and $\alpha_p$ is a predetermined mathematical constant, for example equal to 0.74.

Subsequently, the method 200 comprises determining 11 the status of the tyre 99 based on a comparison between the reference frequency (or in one alternative embodiment the first frequency) and the frequency of the determined peak of the frequency spectrum obtained in the second operative phase, for exemplarily determining a status of loss of integrity and/or a status of wear of the tyre 99.

Exemplarily the status of wear of the tyre 99 is determined provided that the frequency of determined peak increases, i.e., the frequency of the determined peak obtained in the second operative phase is greater than the reference frequency.

Exemplarily the status of loss of integrity of the tyre is determined provided that the frequency of determined peak decreases, i.e., the frequency of the determined peak obtained in the second operative phase is less than the reference frequency.

It is also exemplarily possible calculating a modal mass percentual reduction (correlated to the wear phenomenon) for example by the following formula:

$$\Delta m \, \% = \frac{f_0^2}{f^2} * 100$$

wherein $\Delta m \, \%$ is the modal mass percentual reduction, $f_0$ is the reference frequency, and f is the frequency of the determined peak obtained in the second operative phase. Alternatively, it is also possible to calculate a current modal mass of the tyre 99, i.e., the residual modal mass of the tyre due to the wear phenomenon, exemplarily by the formula:

$$m = m_0 * \left( \frac{f_0^2}{f^2} \right)$$

wherein m is the current modal mass and $m_0$ is the reference modal mass (for example acquired at the fitting of the tyre on the vehicle).

From the current modal mass m or from the value of modal mass reduction $\Delta m \, \%$ it is then possible deriving the tread thickness lost due to wear, as a function of physical and geometric parameters of the tyre, for example the density of the compound, the initial width and the initial thickness of the tread band.

It is also exemplarily possible calculating a modal stiffness percentual reduction (correlated to the phenomenon of loss of structural integrity) for example by the following formula:

$$\Delta k \, \% = \frac{f^2}{f_0^2}$$

wherein $\Delta k \, \%$ is the modal stiffness percentual reduction.

The invention claimed is:

1. A method for monitoring a status of a tyre fitted on a vehicle, the method comprising:

with the vehicle in motion and the tyre in rotation, acquiring a motion signal representative of a motion of a crown portion of the tyre, wherein the motion signal temporally corresponds to a plurality of turns of the tyre;

obtaining a frequency spectrum of the motion signal; and determining the status of the tyre based the frequency spectrum, wherein the motion signal is representative of an axial component of the motion of the crown portion; and wherein the motion signal comprises a plurality of motion signal portions respectively temporally corresponding to a plurality of continuous time intervals, wherein each continuous time interval is temporally separated from the temporally subsequent continuous time interval, and wherein each motion signal portion temporally corresponds to a plurality of turns of the tyre.

2. The method according to claim 1, wherein the motion signal is an accelerometric signal representative of an axial component of a linear acceleration undergone by the crown portion of the tyre, and wherein the plurality of turns of the tyre contains a total number of the turns greater than or equal to 300 and less than or equal to 2000.

3. The method according to claim 1, wherein determining the status of the tyre is carried out based on a time trend of a portion of the frequency spectrum in a frequency range from 20 Hz up to 120 Hz.

4. The method according to claim 1, wherein the frequency spectrum comprises a plurality of peaks, wherein the method further comprises identifying a determined peak in the plurality of peaks and determining a frequency of the determined peak, and wherein the frequency of the determined peak is a modal frequency of a lateral translational vibration mode of the tyre.

5. The method according to claim 4, wherein identifying the determined peak comprises:

in the frequency spectrum, ordering the peaks of the plurality of peaks, assigning a sequential order n to an increasing value of the frequency of each peak in the frequency spectrum;

in the frequency spectrum, identifying a peak of order n equal to one, the peak of order n equal to one being the determined peak, or wherein identifying the determined peak comprises identifying in the frequency spectrum a peak in a predetermined frequency range going from 20 Hz up to 100 Hz.

6. The method according to claim 4, wherein determining the status of the tyre comprises:

determining a status of loss of structural integrity of the tyre on condition that the frequency of the determined peak temporally decreases, or determining a status of wear of the tyre on condition that the frequency of the determined peak temporally increases.

7. The method according to claim 1, wherein acquiring the motion signal is carried out when one or more of the following conditions occurs:

a lateral acceleration of the vehicle is less than or equal to 2 m/s²;

a longitudinal acceleration of the vehicle is less than or equal to 2 m/s²; and a forward speed of the vehicle is greater than or equal to 20 km/h and less than or equal to 80 km/h.

8. The method according to claim 1, wherein acquiring the motion signal comprises acquiring a raw signal representative of the axial component of the motion of the crown portion and filtering from the raw signal, a part of the raw signal temporally corresponding to at least to each passage of the crown portion in a footprint area of the tyre.

9. The method according to claim 1, wherein acquiring the motion signal is carried out at a current value of a pressure of the tyre and the method further comprises detecting the current value of pressure, and wherein determining the status of the tyre based on the frequency spectrum is carried out as a function of at least the pressure.

10. The method according to claim 1, further comprising identifying a determined peak in a plurality of peaks of the frequency spectrum and determining a frequency of the determined peak, wherein determining the status of the tyre comprises determining a status of wear of the tyre by:

determining a reference modal mass of the tyre in a reference status, wherein the reference modal mass is greater than or equal to 60% of a total mass of the tyre, or less than or equal to 85% of a total mass of the tyre, or greater than or equal to 60%, and less than or equal to 85%, of a total mass of the tyre;

determining a reference modal stiffness of the tyre in the reference status as a function of the reference modal mass of the tyre and of the frequency of the determined peak determined with the tyre in the reference status; and determining a thickness of a tread of the tyre as a function of the reference modal mass, the reference modal stiffness, the frequency of the determined peak, and as a function of geometric parameters, or physical parameters, or geometric and physical parameters of the tyre, wherein the reference status is a status of undamaged and not worn tyre, and wherein the method comprises determining the reference status when the vehicle has travelled a distance greater than or equal to 300 km and less than or equal to 1000 km since when the tyre in a new status is fitted.

11. The method according to claim 1, wherein acquiring a motion signal, obtaining the frequency spectrum, and determining the status of the tyre based on the frequency spectrum are carried out in a first operative phase with the tyre in a reference status and in a second operative phase subsequent to the first operative phase, wherein the reference status is a status of undamaged and not worn tyre.

12. The method according to claim 11, further comprising, in the second operative phase, determining a reference frequency using a predetermined mathematical function expressed by the following formula:

$$f(p) = \sqrt{f_0^2\left(1 + \alpha_p \frac{p - p_0}{p_0}\right)}$$

wherein f(p) is the reference frequency; p is a value of a pressure of the tyre detected in the second operative phase; $f_0$ is a frequency of a determined peak of the frequency spectrum obtained in the first operative phase; po is a value of the pressure detected in the first operative phase; and $\alpha_p$ is a mathematical constant, and wherein determining a status of wear of the tyre comprises calculating a modal mass reduction of the tyre by a quadratic ratio between the reference frequency and the frequency of the determined peak of the frequency spectrum obtained in the second operative phase.

13. A system for monitoring a status of a tyre fitted on a vehicle, the system comprising:

a motion sensor fixed at a crown portion of the tyre and which detects a motion of the crown portion of the tyre and generates a motion signal representative of the motion;

at least one processing unit in communication with the motion sensor and programmed to:

acquire the motion signal, wherein the motion signal temporally corresponds to a plurality of turns of the tyre;

obtain a frequency spectrum of the motion signal; and determine the status of the tyre based on the frequency spectrum, wherein the motion sensor detects an axial component of the motion of the crown portion and the motion signal is representative of the axial component of the motion; and wherein the motion signal comprises a plurality of motion signal portions respectively temporally corresponding to a plurality of continuous time intervals, wherein each continuous time interval is temporally separated from the temporally subsequent continuous time interval, and wherein each motion signal portion temporally corresponds to a plurality of turns of the tyre.

14. The system (100) according to claim 13, wherein the motion sensor is an accelerometric sensor for detecting an axial component of a linear acceleration undergone by the crown portion of the tyre, wherein the motion sensor is fixed at a portion of inner surface, and wherein the system comprises:

a pressure sensor mounted onto the tyre for detecting a pressure of the tyre, the pressure sensor connected to the at least one processing unit; and an acceleration sensor mounted onto the vehicle for detecting a longitudinal acceleration of the vehicle, or a lateral acceleration of the vehicle, or a longitudinal and a lateral acceleration of the vehicle, wherein the acceleration sensor is connected to the at least one processing unit, wherein the at least one processing unit is programmed for carrying out a method for monitoring a status of a tyre fitted on a vehicle.

* * * * *